US011834554B2

(12) United States Patent
Endo et al.

(10) Patent No.: US 11,834,554 B2
(45) Date of Patent: Dec. 5, 2023

(54) CONDUCTIVE SILICONE COMPOSITION AND CURED PRODUCT THEREOF

(71) Applicant: THREEBOND CO., LTD., Tokyo (JP)

(72) Inventors: Satoru Endo, Tokyo (JP); Hitoshi Mafune, Tokyo (JP); Takashi Suzuki, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 591 days.

(21) Appl. No.: 17/048,335

(22) PCT Filed: Apr. 24, 2019

(86) PCT No.: PCT/JP2019/017495
§ 371 (c)(1),
(2) Date: Oct. 16, 2020

(87) PCT Pub. No.: WO2019/220902
PCT Pub. Date: Nov. 21, 2019

(65) Prior Publication Data
US 2021/0163688 A1 Jun. 3, 2021

(30) Foreign Application Priority Data
May 15, 2018 (JP) .................................. 2018-093517

(51) Int. Cl.
C08G 77/12 (2006.01)
C08G 77/08 (2006.01)
C08G 77/20 (2006.01)
C08G 77/00 (2006.01)
C08K 3/08 (2006.01)
C08K 5/541 (2006.01)
C08K 7/18 (2006.01)
C08L 83/04 (2006.01)
H01B 1/22 (2006.01)

(52) U.S. Cl.
CPC ............ *C08G 77/12* (2013.01); *C08G 77/08* (2013.01); *C08G 77/20* (2013.01); *C08G 77/70* (2013.01); *C08K 3/08* (2013.01); *C08K 5/541* (2013.01); *C08K 7/18* (2013.01); *C08L 83/04* (2013.01); *H01B 1/22* (2013.01); C08K 2003/0806 (2013.01); C08K 2201/001 (2013.01)

(58) Field of Classification Search
CPC ........ C08G 77/08; C08G 77/12; C08G 77/20; C08G 77/70; C08K 2003/0806; C08K 2201/001; C08K 3/08; C08K 5/541; C08K 5/5435; C08K 5/56; C08K 7/18; C08L 83/00; C08L 83/04; H01B 1/22; H01B 5/14
See application file for complete search history.

(56) References Cited

U.S. PATENT DOCUMENTS

| 6,017,587 A * | 1/2000 | Kleyer .................... H01B 1/22 524/484 |
| 2002/0049274 A1 | 4/2002 | Azechi et al. |
| 2002/0099114 A1 | 7/2002 | Nakayoshi et al. |
| 2006/0276584 A1 | 12/2006 | Todoroki et al. |
| 2014/0060903 A1* | 3/2014 | Hamada ............... H05K 3/1216 174/257 |
| 2016/0024358 A1* | 1/2016 | Zambova ................ C08L 83/00 252/75 |
| 2019/0023874 A1* | 1/2019 | Jia ............................ C08K 3/04 |
| 2021/0380807 A1* | 12/2021 | Chen ........................ H01B 1/18 |

FOREIGN PATENT DOCUMENTS

| CN | 105315677 A | 2/2016 |
| JP | H07-150048 A | 6/1995 |
| JP | 2002-060625 A | 2/2002 |
| JP | 2006-335926 A | 12/2006 |
| JP | 2011-201934 A | 10/2011 |
| JP | 2014-063989 A | 4/2014 |
| WO | 2007/032481 A1 | 3/2007 |

OTHER PUBLICATIONS

Office Action for the corresponding Chinese patent application No. 201980026760.0, dated Sep. 21, 2022, with English translation.
Office Action dated Jan. 5, 2023 for the corresponding Chinese patent application No. 201980026760.0, with English translation.
Office Action dated Feb. 21, 2023 for the corresponding Japanese patent application No. 2020-519547, with English translation.
PCT, International Search Report for the corresponding patent application No. PCT/JP2019/017495, dated Jul. 16, 2019, with English translation.

(Continued)

*Primary Examiner* — Mark Kopec
*Assistant Examiner* — Jaison P Thomas
(74) *Attorney, Agent, or Firm* — LUCAS & MERCANTI, LLP

(57) ABSTRACT

An object of the present invention is to provide a conductive silicone composition that is cured at a low temperature in a short time and from which a cured product having excellent conductivity can be obtained.

A conductive silicone composition containing (A) to (E) components described below and containing greater than or equal to 10 parts by mass and less than 100 parts by mass of the (D) component with respect to 100 parts by mass of the (A) component:

(A) component: a polyorganosiloxane having one or more alkenyl groups in a molecule
(B) component: a compound having a hydrosilyl group
(C) component: a hydrosilylation catalyst
(D) component: a silane compound having an epoxy group and an alkoxysilyl group
(E) component: a conductive powder.

10 Claims, No Drawings

(56) References Cited

OTHER PUBLICATIONS

CNIPA, Office Action for the corresponding Chinese patent application No. 201980026760.0, dated Apr. 20, 2022, with English translation.
Office Action dated Aug. 1, 2023 for the corresponding Korean Patent Application No. 10-2020-7029094, with English translation.
Office Action dated Sep. 12, 2023 for the corresponding Japanese Patent Application No. 2020-519547, with English translation.

* cited by examiner

CONDUCTIVE SILICONE COMPOSITION AND CURED PRODUCT THEREOF

CROSS REFERENCE TO RELATED APPLICATION

This Application is a 371 of PCT/JP2019/017495 filed on Apr. 24, 2019 which, in turn, claimed the priority of Japanese Patent Application No. 2018-093517 filed on May 15, 2018, both applications are incorporated herein by reference.

TECHNICAL FIELD

The present invention relates to a conductive silicone composition and a cured product thereof.

BACKGROUND ART

Recently, a conductive adhesive agent has been increasingly used related to an electronic component such as a multifunctional mobile-phone unit, a personal computer, and a solar cell. Among them, a conductive silicone composition is excellent from the viewpoint of high reliability and high expansibility, and thus, has been widely used.

SUMMARY OF INVENTION

In JP 2006-335926 A (corresponding to US 2006/0,276,584 A), a conductive silicone composition containing an organopolysiloxane having an average of two or more alkenyl groups in one molecule, an adhesiveness improver, a curing agent, and metal-covered conductive particles is disclosed. However, according to paragraph 0059 of JP 2006-335926 A (corresponding to US 2006/0,276,584 A), it is disclosed that a cured product having high reliability is not obtained without being heated at 180° C. The temperature of 180° C. is an extremely high temperature condition, and thus, there is a problem that it is difficult to apply the conductive silicone composition to an application such as a liquid crystal image display element, an organic EL element, a solar cell element, and the periphery thereof, which are easily degraded by heat.

The present invention has been made in consideration of the circumstances described above, and an object thereof is to provide a conductive silicone composition that is cured at a low temperature in a short time and from which a cured product having excellent conductivity is obtained.

The gist of the present invention will be described below.

[1] A conductive silicone composition containing (A) to (E) components described below and containing greater than or equal to 10 parts by mass and less than 100 parts by mass of the (D) component with respect to 100 parts by mass of the (A) component:
(A) component: a polyorganosiloxane having one or more alkenyl groups in a molecule
(B) component: a compound having a hydrosilyl group
(C) component: a hydrosilylation catalyst
(D) component: a silane compound having an epoxy group and an alkoxysilyl group
(E) component: a conductive powder.

[2] The conductive silicone composition according to [1], in which the alkoxysilyl group of the (D) component is an ethoxysilyl group.

[3] The conductive silicone composition according to [1] or [2], in which the (E) component is contained in a range of 5 mass % to 95 mass % with respect to the entire conductive silicone composition.

[4] The conductive silicone composition according any one of [1] to [3], in which the (B) component has a polyorganosiloxane structure.

[5] The conductive silicone composition according any one of [1] to [4], in which the (B) component is a compound having the hydrosilyl group and a branched polyorganosiloxane structure.

[6] The conductive silicone composition according any one of [1] to [5], in which the (E) component has a spherical shape.

[7] The conductive silicone composition according any one of [1] to [6], in which the conductive silicone composition is a liquid at 25° C.

[8] The conductive silicone composition according any one of [1] to [7], further containing: a reaction rate regulator as an (F) component.

[9] A cured product obtained by curing the conductive silicone composition according any one of [1] to [8].

DESCRIPTION OF EMBODIMENTS

Hereinafter, the details of the present invention will be described.

A conductive silicone composition of the present invention contains (A) to (E) components described below and contains greater than or equal to 10 parts by mass and less than 100 parts by mass of the (D) component with respect to 100 parts by mass of the (A) component:
(A) component: a polyorganosiloxane having one or more alkenyl groups in a molecule
(B) component: a compound having a hydrosilyl group
(C) component: a hydrosilylation catalyst
(D) component: a silane compound having an epoxy group and an alkoxysilyl group
(E) component: a conductive powder.

The present invention provides a conductive silicone composition that is cured at a low temperature in a short time and from which a cured product having excellent conductivity can be obtained.

<(A) Component>

The (A) component of the present invention is not particularly limited insofar as the (A) component is a polyorganosiloxane having one or more alkenyl groups in a molecule. A bonding position of the alkenyl group of the (A) component is not limited, and examples thereof include a terminal of a molecular chain and a side chain of a molecular chain. A molecular structure of the (A) component is substantially linear, and may partially have a branched structure. Examples of such an (A) component include polydimethyl siloxane in which both terminals of a molecular chain are blocked with a vinyl group; a dimethyl siloxane·diphenyl siloxane copolymer in which a molecular chain terminal is blocked with a vinyl group; a dimethyl siloxane·methyl vinyl siloxane·diphenyl siloxane copolymer in which both terminals of a molecular chain are blocked with a vinyl group; polydimethyl siloxane in which one terminal of a molecular chain is blocked with a vinyl group, and the other terminal of the molecular chain is blocked with a trimethoxy group; polydimethyl siloxane in which one terminal of a molecular chain is blocked with a vinyl group, and the other terminal of the molecular chain is blocked with a trimethyl siloxy group; a dimethyl siloxane·methyl vinyl siloxane copolymer in which both terminals of a molecular chain are blocked with a trimethyl siloxy group; and a dimethyl siloxane·methyl vinyl siloxane·diphenyl siloxane copolymer in which both terminals of a molecular chain are blocked with a trimethyl siloxy group. Among them, polydimethyl siloxane in which both terminals of a molecular chain are blocked with a vinyl group is preferable from the viewpoint of being cured at a low temperature in a short time and obtaining a cured product having excellent conductivity. Only one type thereof may be independently used, or two or more types thereof may be used together.

The viscosity of the (A) component at 25° C. is preferably greater than or equal to 3 mPa·s (3 centipoises) and less than 150000 mPa·s (150000 centipoise), is more preferably greater than or equal to 50 mPa·s (50 centipoise) and less than 100000 mPa·s (100000 centipoise), and is particularly preferably greater than or equal to 300 mPa·s (300 centipoise) and less than 70000 mPa·s (70000 centipoise). The viscosity of the (A) component at 25° C. is set in the range described above, and thus, the (A) component has low-temperature curing properties, and thus, handleability and bending resistance are excellent. A vinyl equivalent of the (A) component is preferably in a range of greater than or equal to 0.016 Eq/kg and less than or equal to 5 Eq/kg, and is more preferably in a range of greater than or equal to 0.030 Eq/kg and less than or equal to 1 Eq/kg. The vinyl equivalent of the (A) component is set in the range described above, and thus, the (A) component has the low-temperature curing properties, and thus, the handleability and the bending resistance are excellent. The viscosity of the (A) component at 25° C. is measured by using a cone plate type viscometer. The vinyl equivalent of the (A) component is determined by a Wijs method. Specifically, the vinyl equivalent is calculated from the amount of iodine that is consumed by allowing carbon double bond to react with iodine monochloride (an excessive amount), and then, by allowing excessive iodine monochloride to react with potassium iodide, and by titrating liberated iodine with aqueous sodium thiosulfate to an end point.

A weight average molecular weight of the (A) component is preferably greater than or equal to 700 and less than 150000, is more preferably greater than or equal to 2000 and less than 140000, and is particularly preferably greater than or equal to 8000 and less than 130000. In the present invention, the weight average molecular weight of the (A) component is set in the range described above, and thus, it is possible to further maintain the low-temperature curing properties and conduction properties. Note that, herein, the "weight average molecular weight" indicates a weight average molecular weight (Mw) in terms of polystyrene, which is measured by gel permeation chromatography (GPC).

<(B) Component>

The compound having a hydrosilyl group of the (B) component of the present invention is not particularly limited insofar as the compound can be cured by a hydrosilylation reaction with the (A) component. The hydrosilyl group represents a group having a SiH bond. The (B) component is not particularly limited, and examples of thereof include a compound having a hydrosilyl group and a polyorganosiloxane structure in a molecule including a straight-chain molecule, a branched molecule, a cyclic molecule, or a reticular molecule, and the like. The compound having a hydrosilyl group and a polyorganosiloxane structure in a molecule has the low-temperature curing properties, and thus, bending resistance of a cured product is excellent. Among them, a compound having a hydrosilyl group and a branched polyorganosiloxane structure in a molecule is preferable from the viewpoint of the low-temperature curing properties and of obtaining a soft cured product. In addition, the number of hydrosilyl groups in a molecule of the (B) component is not particularly limited, and for example, is preferably greater than or equal to 2, and is more preferably greater than or equal to 3, from the viewpoint of being capable of providing the conductive silicone composition that is further cured at a low temperature in a short time and from which the cured product having excellent conductivity is obtained. In addition, the viscosity of the (B) component at 25° C. is preferably greater than or equal to 0.1 mPa·s (0.1 centipoise) and less than 15000 mPa·s (15000 centipoise), is more preferably greater than or equal to 0.5 mPa·s (0.5 centipoise) and less than 5000 mPa·s (5000 centipoise), and is particularly preferably greater than or equal to 1 mPa·s (1 centipoise) and less than 3000 mPa·s (3000 centipoise), from the viewpoint of having the low-temperature curing properties and of excellent bending resistance of the cured product. In addition, a hydrogen equivalent of the (B) component is preferably in a range of greater than or equal to 0.01 Eq/kg and less than or equal to 300 Eq/kg, and is more preferably in a range of greater than or equal to 0.3 Eq/kg and less than or equal to 100 Eq/kg, from the viewpoint of being capable of providing conductive silicone composition that is further cured at a low temperature in a short time and from which the cured product has excellent conductivity is obtained. The viscosity of the (B) component at 25° C. is measured by using a cone plate type viscometer. The hydrogen equivalent of the (B) component is a value that can be measured by a Fourier transform infrared (FTIR) or $^{29}$Si-NMR method.

Examples of the compound having a hydrosilyl group and a straight-chain polyorganosiloxane structure include hydrogen-terminated polydimethyl siloxane, hydrogen-terminated polyphenyl methyl siloxane, a hydrogen-terminated methyl hydrosiloxane-dimethyl siloxane copolymer, a trimethyl siloxy-terminated methyl hydrosiloxane-dimethyl siloxane copolymer, trimethyl siloxy-terminated polymethyl hydrosiloxane, triethyl siloxy-terminated polyethyl hydrosiloxane, and the like. Examples of the compound having a hydrosilyl group and a branched polyorganosiloxane structure include a hydrogenated Q resin. Only one type thereof may be used singly, or two or more types thereof may be used together. Examples of the branched polyorganosiloxane structure include a structure in which organosiloxane is a main chain and a side chain having an organosiloxane skeleton is branched from the main chain.

The hydrogenated Q resin indicates a siloxane resin having a siloxane structure that has a Q unit and a hydrosilyl group. The Q unit is a chemical structural unit of a siloxane compound, and indicates a structural unit in which a silicon atom is bonded only to an oxygen atom and is not bonded to a carbon atom. In addition, a (tetrafunctional) Q unit is represented by SiO4/2. Specific examples of the hydrogenated Q resin include a compound represented by Formula (1) described below, and the like. Me in Formula (1) indicates a methyl group.

[Chemical Formula 1]

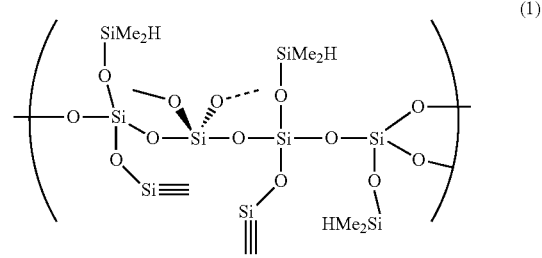

(1)

A commercially available product of the compound having a hydrosilyl group and a straight-chain polyorganosiloxane structure is not particularly limited, and examples thereof include DMS-H013, DMS-H11, DMS-H21, DMS-H025, DMS-H31, DMS-H42, PMS-H03, HMS-013, HMS-031, HMS-064, HMS-071, HMS-991, HMS-992, HMS-993, HDP-111, HPM-502, HMS-151, and HMS-301 (manufactured by Gelest, Inc.), SH1107 Fluid manufactured by Dow Toray Co., Ltd.), CR100 (manufactured by KANEKA CORPORATION), KF-99 and KF-9901 (manufactured by Shin-Etsu Chemical Co., Ltd.), and the like. A commercially available product of the compound having a hydrosilyl group and a branched polyorganosiloxane structure is not particularly limited, and examples thereof include HQM-105 and HQM-107 (manufactured by Gelest, Inc.), and the like.

An addition amount of the (B) component with respect to 1 mol of the alkenyl group of the (A) component is not particularly limited, the amount such that the hydrosilyl group is 0.5 mol to 12.0 mol is preferable, more preferably the amount such that the hydrosilyl group is 1.5 mol to 10.0 mol, even more preferably the amount such that the hydrosilyl group is 2.0 mol to 8.0 mol, and particularly preferably the amount such that the hydrosilyl group is 2.5 mol to 7.0 mol. According to the range described above, even in the case of a conductive silicone composition containing a large amount of conductive powder of the (E) component, the conductive silicone composition is further cured at a low temperature in a short time and a cured product having excellent conductivity is obtained. The content of the (B) component with respect to 100 parts by mass of the (A) component is not particularly limited, and for example, is preferably 0.1 parts by mass to 100 parts by mass, is more preferably 0.5 parts by mass to 50 parts by mass, and is particularly preferably 1 part by mass to 30 parts by mass. According to the range described above, even in the case of a conductive silicone composition containing a large amount of conductive powder of the (E) component, the conductive silicone composition is further cured at a low temperature in a short time and a cured product having excellent conductivity is obtained.

<(C) Component>

The hydrosilylation catalyst that is the (C) component of the present invention is not particularly limited insofar as the hydrosilylation catalyst is capable of catalyzing a hydrosilylation reaction, and an arbitrary hydrosilylation catalyst can be used.

Examples of the (C) component include hydrogen chloroplatinate; elemental platinum; a catalyst in which solid platinum is supported on a carrier such as alumina, silica, carbon black, and the like; a complex of hydrogen chloroplatinate and alcohol, aldehyde, ketone, and the like; a platinum-olefin complex such as $Pt(CH_2=CH_2)_2Cl_2$; a platinum-vinyl siloxane complex such as platinum divinyl tetramethyl disiloxane complex, $Pt_n(ViMe_2SiOSiMe_2Vi)_x$ and $Pt[(MeViSiO)_4]_y$; and a platinum-phosphite complex such as $Pt(PPh_3)_4$ and $Pt(PBu_3)_4$ (Vi indicates a vinyl group, Me indicates a methyl group, Ph indicates a phenyl group, and Bu indicates a butyl group. n, x, and y indicate a positive real number). Among them, hydrogen chloroplatinate, a platinum-olefin complex, a platinum-vinyl siloxane complex, and the like are preferable from the viewpoint of excellent activity. Only one type thereof may be used singly, or two or more types thereof may be used together.

The amount of catalyst of the (C) component is not particularly limited, but the catalyst maybe used as a compound preferably in a range of $1 \times 10^0$ mol to $1 \times 10^{-10}$ mol, and more preferably in a range of $1 \times 10^{-1}$ mol to $1 \times 10^{-8}$ mol, with respect to 1 mol of the alkenyl group in the (A) component. According to the range described above, the conductive silicone composition is further cured at a low temperature in a short time and the cured product having excellent conductivity is obtained.

<(D) Component>

The silane compound having an epoxy group and an alkoxysilyl group that is the (D) component of the present invention is greater than or equal to 10 parts by mass and less than 100 parts by mass with respect to 100 parts by mass of the (A) component. According to the range described above, there is a remarkable effect that the conductive silicone composition is cured at a low temperature in a short time and the cured product having excellent conductivity is obtained. Examples of the epoxy group include a glycidyl group, an epoxy cyclohexyl ethyl group, and the like. Further, a glycidoxypropyl group is preferable, and a 3-glycidoxypropyl group is more preferable, as the glycidyl group, from the viewpoint that the conductive silicone composition is further cured at a low temperature in a short time and the cured product having excellent conductivity is obtained. A 2,3-epoxy cyclohexyl ethyl group is preferable as the epoxy cyclohexyl ethyl group. Only one type thereof may be used singly, or two or more types thereof may be used together. Examples of the alkoxysilyl group include a methoxysilyl group, an ethoxysilyl group, a propoxysilyl group, and the like. Among them, an ethoxysilyl group and a propoxysilyl group are preferable from the viewpoint that the conductive silicone composition is further cured at a low temperature in a short time and the cured product having excellent conductivity is obtained, and an ethoxysilyl group is more preferable from the viewpoint of being capable of maintaining conduction properties even after a 100%-stretching cycle test and of excellent adhesion with respect to gold plating.

Examples of the (D) component include 2-(3,4-epoxy cyclohexyl) ethyl trimethoxysilane, 3-glycidoxypropyl methyl dimethoxysilane, 3-glycidoxypropyl trimethoxysilane, 3-glycidoxypropyl methyl diethoxysilane, 3-glycidoxypropyl triethoxysilane, a silicone oligomer having one or more alkoxy groups and one or more epoxy groups, and the like. Among them, 3-glycidoxypropyl methyl diethoxysilane and 3-glycidoxypropyl triethoxysilane are preferable from the viewpoint that the conductive silicone composition is further cured at a low temperature in a short time and the cured product having excellent conductivity is obtained. A commercially available product of the (D) component is not particularly limited, and examples thereof include A-186, A187, and A-1871 (manufactured by Momentive Performance Materials Japan LLC), KBM-303, KBM-402, KBM-403, KBE-402, KBE-403, and X-41-1056 (manufactured by Shin-Etsu Chemical Co., Ltd.), and the like.

A preferred content of the (D) component is greater than or equal to 10.5 parts by mass and less than 75 parts by mass, is particularly preferably greater than or equal to 11 parts by mass and less than 50 parts by mass, with respect to 100 parts by mass of the (A) component. According to the range described above, the conductive silicone composition is further cured at a low temperature in a short time and the cured product having excellent conductivity is obtained. In addition, the conductivity is stabilized at a low temperature in a short time.

<(E) Component>

The (E) component of the present invention is not particularly limited insofar as the component is a conductive powder. A known conductive filler can be used as a material used in the (E) component. For example, metal particles made of one or more types selected from metals such as gold, silver, copper, nickel, palladium, platinum, tin, and bismuth, or alloy particles made of a combination of a plurality of types of metals, or silicone particles, (meth)acryl particles, polystyrene particles, and urethane particles, of which the surface is covered with the metals, and the like. Only one type thereof may be used singly, or two or more types thereof may be used together. Examples of the shape of the (E) component include a crushed shape, a spherical shape, a fibrous shape, a branched shape, and the like, and among them, a spherical shape is preferable from the viewpoint of obtaining the cured product that is capable of maintaining the conduction properties even after the 100%-stretching cycle test. Here, the spherical shape indicates that a sphericity (Short Diameter/Long Diameter) represented by a short diameter with respect to a long diameter is 0.6 to 1.0.

In addition, as the (E) component, it is possible to properly use particles having a preferred average particle diameter, in accordance with a pitch width between electrodes on a substrate to be connected or the thickness of the electrode. For example, it is preferable to use particles having a small average particle diameter as the pitch width decreases. In the present invention, a preferred average particle diameter is in a range of 0.01 μm to 100 μm, is more preferably in a range of 0.1 μm to 30 μm, and among them, particles having a sharp particle size distribution at the time of being measured with a particle size analyzer are particularly preferable. In addition, the average particle diameter of the (E) component is a 50% average particle diameter that is obtained by a laser diffraction.scattering method. A specific surface area of the (E) component is preferably 0.1 m$^2$/g to 10 m$^2$/g, is more preferably 0.5 m$^2$/g to 7 m$^2$/g, and is particularly preferably 1 m$^2$/g to 5 m$^2$/g. According to the range described above, the conductive silicone composition can be cured at a low temperature in a short time, and it is possible to obtain the cured product having excellent conductivity, and to shorten a time until a resistance value is stabilized at the time of curing. The specific surface area is a value that is calculated from a BET specific surface area.

The content of the (E) component is not limited in the present invention, but in a case where the content of the (A) component is set to 100 parts by mass, the content of the (E) component is preferably in a range of 10 parts by mass to 1500 parts by mass, and is more preferably in a range of 50 parts by mass to 1000 parts by mass. In a case where the content of the component is greater than or equal to 10 parts by mass, it is possible to obtain stable conduction properties, and in a case where the content of the component is less than or equal to 1500 parts by mass, coating properties are excellent without increasing the viscosity of the conductive silicone composition. In addition, the (E) component is preferably in a range of 5 mass % to 95 mass %, is more preferably in a range of 10 mass % to 85 mass %, and is particularly preferably in a range of 20 mass % to 75 mass %, with respect to the entire conductive silicone composition. According to the range described above, the conductive silicone composition is cured at a low temperature in a short time and the cured product having excellent conductivity is obtained. In addition, in the present invention, because of having excellent conductivity, it is capable to maintain a constant conductivity even in the case of decreasing the content of the (E) component. In the case of decreasing the content of the (E) component, it is possible to obtain a conductive silicone composition from which a more flexible cured product is obtained.

The conductive silicone composition of the present invention may further contain a reaction rate regulator as an (F) component. Examples of the (F) component include an alkyne compound, maleic acid esters, an organic phosphorus compound, an organic sulfur compound, a nitrogen-containing compound, and the like. Only one type thereof may be used singly, or two or more types thereof may be used together. Specifically, examples of the alkyne compound include 3-hydroxy-3-methyl-1-butyne, 3-hydroxy-3-phenyl-1-butyne, 3,5-dimethyl-1-hexyn-3-ol, 1-ethynyl-1-cyclohexanol, and the like. In addition, examples of the maleic acid esters include a maleic anhydride, dimethyl maleate, and the like. In addition, specifically, triorganophosphines, diorganophosphines, organophosphones, triorganophosphites, and the like can be exemplified as the organic phosphorus compound. In addition, specifically, organomercaptans, diorganosulfides, hydrogen sulfide, benzothiazole, thiazole, benzothiazole disulfide, and the like can be exemplified as the organic sulfur compound. In addition, specifically, N,N,N',N'-tetramethyl ethylene diamine, N,N-dimethyl ethylene diamine, N,N-diethyl ethylene diamine, N,N-dibutyl ethylene diamine, N,N-dibutyl-1,3-propane diamine, N,N-dimethyl-1,3-propane diamine, N,N,N',N'-tetraethyl ethylene diamine, N,N-dibutyl-1,4-butane diamine, 2,2'-bipyridine, and the like can be exemplified as the nitrogen-containing compound. The content of the (F) component is not limited in the present invention, but in a case where the content of the (A) component is set to 100 parts by mass, the content of the (F) component is preferably in a range of 0.01 part by mass to 10 parts by mass, and is more preferably in a range of 0.05 part by mass to 3 parts by mass, from the viewpoint of making the low-temperature curing properties and storage stability compatible.

<Arbitrary Component>

The conductive silicone composition of the present invention is capable of containing additives such as a reactive diluent, an elastomer, a filling material, a preservation stabilizer, an antioxidant, a light stabilizer, a plasticizer, a solvent, a pigment, a flame retarder, and a surfactant, as an arbitrary component, within a range not impairing the object of the present invention.

The conductive silicone composition of the present invention may contain a reactive diluent. Examples of the reactive diluent include 2,4,6-tris(allyloxy)-1,3,5-triazine, 1,2-polybutadiene, a 1,2-polybutadiene derivative, trimethylol propane diallyl ether, pentaerythritol triallyl ether, pentaerythritol tetra(meth)acrylate, trimethylol propane tri(meth)acrylate, trimethylol propane di(meth)acrylate, triallyl phosphoric acid ester, triallyl isocyanurate, diallyl isocyanurate, diallyl monoglycidyl isocyanurate, diallyl monobenzyl isocyanurate, diallyl monopropyl isocyanurate, diallyl phthalate, triallyl trimellitate, diethylene glycol bisallyl carbonate, trimethylol propane diallyl ether, trimethylol propane triallyl ether, pentaerythritol triallyl ether, pentaerythritol tetraallyl ether, 1,1,2,2-tetraallyloxyethane, diallylidene pentaerythrite, triallyl cyanurate, 1,2,4-trivinyl cyclohexane, 1,4-butane diol diallyl ether, nonane diol diallyl ether, 1,4-cyclohexane dimethanol diallyl ether, triethylene glycol diallyl ether, diallyl ether of bisphenol S, divinyl benzene, divinyl biphenyl, 1,3-diisopropenyl benzene, 1,4-diisopropenyl benzene, 1,3-bis(allyloxy)adamantane, 1,3-bis(vinyloxy)adamantane, 1,3,5-tris(allyloxy)adamantane, 1,3,5-tris(vinyloxy)adamantane, dicyclopentadiene, vinyl cyclohexene, 1,5-hexadiene, 1,9-decadiene, diallyl ether, bisphenol A diallyl ether, 2,5-diallyl phenol allyl ether, and an oligomer thereof, allyl ether of novolak phenol, and the like. Among them, 1,2,4-trivinyl cyclohexane, triallyl isocyanurate, 2,4,6-tris(allyloxy)-1,3,5-triazine, 1,2-polybutadiene, and the like are preferable from the viewpoint of excellent compatibility with respect to the (A) component of the present invention.

The conductive silicone composition of the present invention may contain an elastomer in order to adjust rubber properties of the cured product. The elastomer is not particularly limited, and examples thereof include a styrene-butadiene copolymer (SB), a styrene-isoprene copolymer (SIP), a styrene-ethylene-butylene-styrene copolymer (SEBS), a styrene-isobutylene-styrene copolymer (SIBS), an acrylonitrile-styrene copolymer (AS), a styrene-butadiene-acrylonitrile copolymer (ABS), and the like.

The conductive silicone composition of the present invention may contain a filling material to an extent that preservation stability is not impaired, in order to improve an elastic modulus, fluidity, and the like of the cured product. Specifically, examples of the filling material include an organic powder, an inorganic powder, a metallic powder, and the like.

Examples of the filling material of the inorganic powder include glass, fumed silica, alumina, mica, ceramic, a silicone rubber powder, calcium carbonate, aluminum nitride, a carbon powder, kaolin clay, dry clay mineral, dry diatomous earth, and the like. It is preferable that the content of the inorganic powder is approximately 0.1 part by mass to 100 parts by mass with respect to 100 parts by mass of the (A) component. In a case where the content is greater than or equal to 0.1 part by mass, an effect of improving the elastic modulus, the fluidity, and the like of the cured product is sufficiently obtained, and in a case where the content is less than or equal to 100 parts by mass, the conductive silicone composition is excellent in fluidity, and workability is improved.

The fumed silica can be contained in order to adjust the viscosity of the conductive silicone composition or to improve a mechanical strength of the cured product. Preferably, fumed silica and the like, subjected to a hydrophobizing treatment with organochlorosilanes, polyorganosiloxane, hexamethyl disilazane, and the like, can be used. Specific examples of the fumed silica include a commercially available product such as AEROSIL (Product Name, Registered Trademark) R974, R972, R972V, R972CF, R805, R812, R812S, R816, R8200, RY200, RX200, RY200S, R202, and the like, manufactured by NIPPON AEROSIL CO., LTD.

Examples of the filling material of the organic powder include polyethylene, polypropylene, nylon, crosslinked acryl, crosslinked polystyrene, polyester, polyvinyl alcohol, polyvinyl butyral, polycarbonate, and the like. It is preferable that the content of the organic powder is approximately 0.1 part by mass to 100 parts by mass with respect to 100 parts by mass of the (A) component, from the viewpoint of excellent bending resistance of the cured product.

The conductive silicone composition of the present invention may contain a preservation stabilizer. A radical absorber such as benzoquinone, hydroquinone, and hydroquinone monomethyl ether, a metal chelating agent such as an ethylenediaminetetraacetic acid or a disodium salt thereof, an oxalic acid, acetyl acetone, and o-aminophenol, and the like can also be contained as the preservation stabilizer.

The conductive silicone composition of the present invention may contain an antioxidant. Examples of the antioxidant include a quinone-based compound such as β-naphthoquinone, 2-methoxy-1,4-naphthoquinone, methyl hydroquinone, hydroquinone, hydroquinone monomethyl ether, mono-tert-butyl hydroquinone, 2,5-di-tert-butyl hydroquinone, p-benzoquinone, 2,5-diphenyl-p-benzoquinone, and 2,5-di-tert-butyl-p-benzoquinone;

phenols such as phenothiazine, 2,2-methylene-bis(4-methyl-6-tert-butyl phenol), catechol, tert-butyl catechol, 2-butyl-4-hydroxyanisole, 2,6-di-tert-butyl-p-cresol, 2-tert-butyl-6-(3-tert-butyl-2-hydroxy-5-methyl benzyl)-4-methyl phenyl acrylate, 2-[1-(2-hydroxy-3,5-di-tert-pentyl phenyl) ethyl]-4,6-di-tert-pentyl phenyl acrylate, 4,4'-butylidene bis (6-tert-butyl-3-methyl phenol), 4,4'-thiobis(6-tert-butyl-3-methyl phenol), 3,9-bis[2-[3-(3-tert-butyl-4-hydroxy-5-methyl phenyl) propionyloxy]-1,1-dimethyl ethyl]-2,4,8,10-tetraoxaspiro[5,5]undecane, pentaerythritol tetrakis[3-(3,5-di-tert-butyl-4-hydroxyphenyl) propionate], thiodiethylene bis[3-(3,5-di-tert-butyl-4-hydroxyphenyl) propionate], octadecyl-3-(3,5-di-tert-butyl-4-hydroxyphenyl) propionate, N,N'-hexane-1,6-diyl bis[3-(3,5-di-tert-butyl-4-hydroxyphenyl) propione amide], benzene propionate, 3,5-bis(1,1-dimethyl ethyl)-4-hydroxy, C7-C9 side chain alkyl ester, 2,4-dimethyl-6-(1-methyl pentadecyl) phenol, diethyl [[3,5-bis(1,1-dimethyl ethyl)-4-hydroxyphenyl] methyl] phosphonate, 3,3',3'',5,5',5''-hexa-tert-butyl-a,a',a''-(mesitylene-2,4,6-tolyl)tri-p-cresol, calcium diethyl bis[[3,5-bis(1,1-dimethyl ethyl)-4-hydroxyphenyl] methyl] phosphonate, 4,6-bis(octyl thiomethyl)-o-cresol, ethylene bis(oxyethylene)bis[3-(5-tert-butyl-4-hydroxy-m-tolyl) propionate], hexamethylene bis[3-(3,5-di-tert-butyl-4-hydroxyphenyl) propionate, 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylyl) methyl]-1,3,5-triazine-2,4,6(1H,3H,5H)-trione, a reaction product of N-phenyl benzene amine and 2,4,6-trimethyl pentene, 2,6-di-tert-butyl-4-(4,6-bis(octyl thio)-1,3,5-triazin-2-yl amino)phenol, a picric acid, and a citric acid; a phosphorus-based compound such as tris(2,4-di-tert-butyl phenyl) phosphite, tris[2-[[2,4,8,10-tetra-tert-butyl dibenzo[d,f][1,3,2]dioxaphosphephin-6-yl] oxy]ethyl] amine, bis(2,4-di-tert-butyl phenyl) pentaerythritol diphosphite, bis[2,4-bis(1,1-dimethyl ethyl)-6-methyl phenyl] ethyl ester phosphite, tetrakis(2,4-di-tert-butyl phenyl) [1,1-bisphenyl]-4,4'-diyl bisphosphonite, and 6-[3-(3-tert-butyl-4-hydroxy-5-methyl phenyl) propoxy]-2,4,8,10-tetra-tert-butyl dibenz[d, f][1,3,2]dioxaphosphephine; a sulfur-based compound such as dilauryl 3,3'-thiodipropionate, dimyristyl 3,3'-thiodipropionate, distearyl 3,3'-thiodipropionate, pentaerythrityl tetrakis(3-lauryl thiopropionate), and 2-mercaptobenzimidazole; an amine-based compound such as phenothiazine; a lactone-based compound; a vitamin E-based compound, and the like. Among them, a phenol-based compound is preferable.

The conductive silicone composition of the present invention may contain a light stabilizer. Examples of the light stabilizer include a hindered amine-based compound such as bis(2,2,6,6-tetramethyl-4-piperidyl) sebacate, bis(1,2,2,6,6-pentamethyl-4-piperidyl) sebacate, 4-benzoyl oxy-2,2,6,6-tetramethyl piperidine, 1-[2-[3-(3,5-di-tert-butyl-4-hydroxyphenyl) propionyl oxy]ethyl]-4-[3-(3,5-di-tert-butyl-4-hydroxyphenyl) propionyl oxy]-2,2,6,6-tetramethyl piperidine, 1,2,2,6,6-pentamethyl-4-piperidinyl-methacrylate, bis(1,2,2,6,6-pentamethyl-4-piperidinyl)[[3,5-bis(1,1-dimethyl ethyl)-4-hydroxyphenyl] methyl] butyl malonate, decanedioic acid bis(2,2,6,6-tetramethyl-1(octyl oxy)-4-piperidinyl) ester, a reaction product of 1,1-dimethyl ethyl hydroperoxide and octane, N,N',N'',N'''-tetrakis-(4,6-bis-(butyl-(N-methyl-2,2,6,6-tetramethyl piperidin-4-yl amino)-triazin-2-yl-4,7-diazadecane-1,10-diamine, a polycondensate of dibutyl amine·1,3,5-triazine·N,N'-bis(2,2,6,6-tetramethyl-4-piperidyl-1,6-hexamethylene diamine and N-(2,2,6,6-tetramethyl-4-piperidyl) butyl amine, poly[[6-(1, 1,3,3-tetramethyl butyl) amino-1,3,5-triazine-2,4-diyl][(2,2, 6,6-tetramethyl-4-piperidyl) imino]hexamethylene [(2,2,6, 6-tetramethyl-4-piperidyl)imino]], a polymer of dimethyl succinate and 4-hydroxy-2,2,6,6-tetramethyl-l-piperidine ethanol, 2,2,4,4-tetramethyl-20-(β-lauryl oxycarbonyl) ethyl-7-oxa-3,20-diazadispiro[5·1·11·2] heneicosan-21-one, (β-alanine, N-(2,2,6,6-tetramethyl-4-piperidinyl)-dodecyl ester/tetradecyl ester, N-acetyl-3-dodecyl-1-(2,2,6,6-tetramethyl-4-piperidinyl)pyrrolidine-2,5-dione, 2,2,4,4-tetramethyl-7-oxa-3,20-diazadispiro[5,1,11,2]heneicosan-21-one, 2,2,4,4-tetramethyl-21-oxa-3,20-diazadicyclo-[5,1,11,2]-heneicosane-20-propionate dodecyl ester/tetradecyl ester, a propane dioic acid, [(4-methoxyphenyl)-methylene]-bis(1,2, 2,6,6-pentamethyl-4-piperidinyl) ester, a higher fatty acid ester of 2,2,6,6-tetramethyl-4-piperidinol, 1,3-benzene dicarboxyamide, and N,N'-bis(2,2,6,6-tetramethyl-4-piperidinyl); a benzophenone-based compound such as octabenzone; a benzotriazole-based compound such as 2-(2H-benzotriazol-2-yl-4-(1,1,3,3-tetramethyl butyl) phenol, 2-(2-hydroxy-5-methyl phenyl) benzotriazole, 2-[2-hydroxy-3-(3,4,5,6-tetrahydrophthalimide-methyl)-5-methyl phenyl] benzotriazole, 2-(3-tert-butyl-2-hydroxy-5-methyl phenyl)-5-chlorobenzotriazole, 2-(2-hydroxy-3,5-di-tert-pentyl phenyl) benzotriazole, a reaction product of methyl 3-(3-(2H-benzotriazol-2-yl)-5-tert-butyl-4-hydroxyphenyl) propionate and polyethylene glycol, and 2-(2H-benzotriazol-2-yl)-6-dodecyl-4-methyl phenol; a benzoate-based compound such as 2,4-di-tert-butyl phenyl-3,5-di-tert-butyl-4-hydroxybenzoate; a triazine-based compound such as 2-(4,6-diphenyl-1,3,5-triazin-2-yl)-5-[(hexyl) oxy]phenol, and the like. A hindered amine-based compound is particularly preferable.

Examples of the solvent include toluene, xylene, isoparaffin, ethyl benzene, hexane, heptane, octane, ethyl acetate, acetone, methyl ethyl ketone, methanol, ethanol, dimethyl formamide, dimethyl sulfoxide, hexamethyl phosphoric triamide, and the like. The content of the solvent is not particularly limited, but is preferably in a range of 1 part by mass to 300 parts by mass, is more preferably in a range of 3 parts by mass to 100 parts by mass, and is particularly preferably in a range of 5 parts by mass to 50 parts by mass, with respect to 100 parts by mass of the (A) component, from the viewpoint of excellent coating workability and excellent bending resistance of the cured product.

The conductive silicone composition of the present invention can be manufactured by a known method of the related art. For example, the conductive silicone composition can be manufactured by blending predetermined amounts of the (A) component to the (E) component, and as necessary, the (F) component or the arbitrary component described above, and by mixing the components preferably at a temperature of 10° C. to 70° C. and preferably for 0.1 hour to 5 hours, with mixing means such as a mixer. In addition, it is preferable that the conductive silicone composition is manufactured in a light shielding environment.

<Coating Method>

A known coating method of a sealing agent or an adhesive agent is used as a method for applying the conductive silicone composition of the present invention onto an adherend. For example, methods such as a dispensing method using an automatic coater, a spray method, an ink jet method, a screen printing method, a gravure printing method, a dipping method, and a spin coating method can be used. Note that, it is preferable that the conductive silicone composition of the present invention is a liquid at 25° C. from the viewpoint of the coating properties.

<Curing Method and Cured Product>

The conductive silicone composition of the present invention can be cured at a low temperature (lower than 100° C.) (the low-temperature curing properties). In a heating condition of a curing method of the conductive silicone composition of the present invention, a heating-curing temperature is not particularly limited, but for example, is preferably higher than or equal to 45° C. and lower than 100° C., and is more preferably higher than or equal to 50° C. and lower than 95° C., from the viewpoint of decreasing damage with respect to a member of the adherend. A heating-curing time is not particularly limited, but in a case where the heating-curing temperature is higher than or equal to 45° C. and lower than 100° C., the heating-curing time is preferably longer than or equal to 3 minutes and shorter than 5 hours, and is more preferably longer than or equal to 10 minutes and shorter than or equal to 3 hours, from the viewpoint of a production efficiency of a manufacturing method using the conductive silicone composition. A cured product that is obtained by curing the conductive silicone composition of the present invention is also a part of the embodiments of the present invention.

<Application>

The conductive silicone composition of the present invention can be used as a conductive adhesive agent that is required in, for example, a liquid crystal image display element, an organic EL element, a solar cell element, a camera module, a flexible printed substrate, a wearable device, and the periphery thereof, from the viewpoint that the conductive silicone composition is cured at a low temperature in a short time and the cured product having excellent conductivity is obtained. More specifically, in a liquid crystal image display element, an organic EL element, a solar cell element, and a camera module, a grounding application is exemplified. Further, the conductive silicone composition of the present invention can be preferably used as a conductive adhesive agent for a wearable device, from the viewpoint of being capable of maintaining the conduction properties of the cured product formed by curing the conductive silicone composition of the present invention even after the 100%-stretching cycle test. In addition, the conductive silicone composition of the present invention is preferable in an application for connecting a flexible printed board to a terminal using gold plating, from the viewpoint of excellent adhesion with respect to gold plating. Note that, when the conductive silicone composition is used in such an application, it is preferable that the conductive silicone composition of the present invention is a liquid at 25° C. from the viewpoint of the handleability.

EXAMPLES

Hereinafter, the present invention will be described in more detail by using Examples, but the present invention is not limited to Examples.

<Preparation of Conductive Silicone Composition>

Example 1

100 parts by mass of polydimethyl siloxane in which both terminals of a molecular chain are blocked with a vinyl group, a viscosity at 25° C. is 3500 mPa·s (3500 centipoise), a weight average molecular weight is 43000, and a vinyl equivalent is 0.055 Eq/kg (manufactured by Gelest, Inc.), as the (A) component of the present invention, 2.5 parts by mass (an amount in which a hydrosilyl group is 5.0 mol with respect to 1 mol of the alkenyl group contained in the (A)

component) of a hydrogenated Q resin represented by Formula (1) described below in which a viscosity at 25° C. is 4 mPa·s (4 centipoise), and a hydrogen equivalent is 8.5 Eq/kg (manufactured by Gelest, Inc.), as the (B) component, 0.4 part by mass ($5 \times 10^{-3}$ mol with respect to 1 mol of the alkenyl group in the (A) component, as a compound) of an isopropyl alcohol solution of a platinum divinyl tetramethyl disiloxane complex (manufactured by Umicore Precious Metals Japan Inc.), as the (C) component, 12.5 parts by mass of 3-glycidoxypropyl triethoxysilane (manufactured by Shin-Etsu Chemical Co., Ltd.), as the (D) component, 275 parts by mass of a spherical silver powder in which an average particle diameter is 7 μm and a specific surface area is 2.5 m$^2$/g, as the (E) component, 12.5 parts by mass of an isoparaffin-based solvent, and 0.5 part by mass of dimethyl maleate, as the (F) component, were added, and were mixed at 25° C. for 60 minutes with a mixer, and thus, Example 1 was obtained which is a conductive silicone composition that is a liquid at 25° C. Note that, the content of the (E) component of Example 1 is 66 mass % with respect to the entire conductive silicone composition.

[Chemical Formula 2]

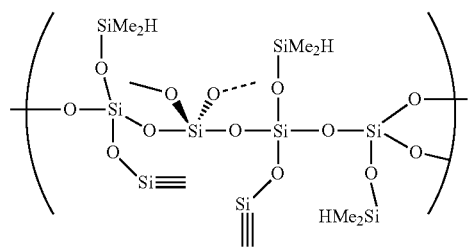

(1)

Example 2

In Example 1, the preparation was performed as with Example 1 except that 12.5 parts by mass of 3-glycidoxypropyl triethoxysilane was changed to 18.8 parts by mass, and thus, Example 2 was obtained which is a conductive silicone composition that is a liquid at 25° C. Note that, the content of the (E) component of Example 2 is 65 mass % with respect to the entire conductive silicone composition.

Example 3

In Example 1, the preparation was performed as with Example 1 except that 3-glycidoxypropyl triethoxysilane was changed to 3-glycidoxypropyl trimethoxysilane, and thus, Example 3 was obtained which is a conductive silicone composition that is a liquid at 25° C. Note that, the content of the (E) component of Example 3 is 66 mass % with respect to the entire conductive silicone composition.

Comparative Example 1

In Example 1, the preparation was performed as with Example 1 except that 3-glycidoxypropyl triethoxysilane (the (D) component) was excluded, and thus, Comparative Example 1 was obtained which is a conductive silicone composition that is a liquid at 25° C. Note that, the content of the (E) component of Comparative Example 1 is 68 mass % with respect to the entire conductive silicone composition.

Comparative Example 2

In Example 1, the preparation was performed as with Example 1 except that 12.5 parts by mass of 3-glycidoxypropyl triethoxysilane was changed to 1.3 parts by mass, and thus, Comparative Example 2 was obtained which is a conductive silicone composition that is a liquid at 25° C. Note that, the content of the (E) component of Comparative Example 2 is 68 mass % with respect to the entire conductive silicone composition.

Comparative Example 3

In Example 1, the preparation was performed as with Example 1 except that 12.5 parts by mass of 3-glycidoxypropyl triethoxysilane was changed to 6.3 parts by mass, and thus, Comparative Example 3 was obtained which is a conductive silicone composition that is a liquid at 25° C. Note that, the content of the (E) component of Comparative Example 3 is 67 mass % with respect to the entire conductive silicone composition.

Comparative Example 4

In Example 1, the preparation was performed as with Example 1 except that 3-glycidoxypropyl triethoxysilane was changed to 3-aminopropyl trimethoxysilane, and thus, Comparative Example 4 was obtained which is a conductive silicone composition that is a liquid at 25° C. Note that, the content of the (E) component of Comparative Example 4 is 66 mass % with respect to the entire conductive silicone composition.

Comparative Example 5

In Example 1, the preparation was performed as with Example 1 except that 3-glycidoxypropyl triethoxysilane was changed to 3-acryloxypropyl trimethoxysilane, and thus, Comparative Example 5 was obtained which is a conductive silicone composition that is a liquid at 25° C. Note that, the content of the (E) component of Comparative Example 5 is 66 mass % with respect to the entire conductive silicone composition.

Comparative Example 6

In Example 1, the preparation was performed as with Example 1 except that 3-glycidoxypropyl triethoxysilane was changed to 3-methacryloxypropyl trimethoxysilane, and thus, Comparative Example 6 was obtained which is a conductive silicone composition that is a liquid at 25° C. Note that, the content of the (E) component of Comparative Example 6 is 66 mass % with respect to the entire conductive silicone composition.

Comparative Example 7

In Example 1, the preparation was performed as with Example 1 except that 3-glycidoxypropyl triethoxysilane was changed to 3-methacryloxypropyl triethoxysilane, and thus, Comparative Example 7 was obtained which is a conductive silicone composition that is a liquid at 25° C. Note that, the content of the (E) component of Comparative Example 7 is 66 mass % with respect to the entire conductive silicone composition.

Comparative Example 8

In Example 1, the preparation was performed as with Example 1 except that 3-glycidoxypropyl triethoxysilane was changed to vinyl trimethoxysilane, and thus, Comparative Example 8 was obtained which is a conductive silicone composition that is a liquid at 25° C. Note that, the content of the (E) component of Comparative Example 8 is 66 mass % with respect to the entire conductive silicone composition.

Comparative Example 9

In Example 1, the preparation was performed as with Example 1 except that 3-glycidoxypropyl triethoxysilane was changed to vinyl triethoxysilane, and thus, Comparative Example 9 was obtained which is a conductive silicone composition that is a liquid at 25° C. Note that, the content of the (E) component of Comparative Example 9 is 66 mass % with respect to the entire conductive silicone composition.

A test method used in Examples and Comparative Examples of Table 1 is as follows.

<(1) Curing Properties at Low Temperature in Short Time>

0.1 g of each conductive silicone composition was dropped onto a hot plate set to 80° C., and after 60 minutes, was in contact with a rod with a sharp tip, and the presence or absence of curing was evaluated by whether or not the conductive silicone composition was attached. Results are collectively shown in Table 1. In the present invention, a case where the curing was confirmed (the conductive silicone composition was not attached) was evaluated as "Cured", and a case where curing failure occurred (the conductive silicone composition was attached) was evaluated as "Curing Failure".

TABLE 1

| Conductive silicone composition | Low-temperature curing properties |
|---|---|
| Example 1 | Cured |
| Example 2 | Cured |
| Example 3 | Cured |
| Comparative Example 1 | Cured |
| Comparative Example 2 | Cured |
| Comparative Example 3 | Cured |
| Comparative Example 4 | Curing failure |
| Comparative Example 5 | Curing failure |
| Comparative Example 6 | Curing failure |
| Comparative Example 7 | Curing failure |
| Comparative Example 8 | Curing failure |
| Comparative Example 9 | Curing failure |

It is found that Examples 1 to 3 and Comparative Examples 1 to 3 of Table 1 are cured at a low temperature in a short time. On the other hand, Comparative Examples 4 to 9 had a curing failure. Accordingly, it is found that low-temperature curing properties can be attained by selecting the (D) component of the present invention in a plurality of silane compounds.

Further, (2) Conduction Properties described below were evaluated with respect to the conductive silicone composition of Examples 1 to 3 and Comparative Examples 1 to 3.

<(2) Evaluation of Conduction Properties>

Preparation of Circuit Substrate

The conductive silicone composition of Examples 1 to 3 and Comparative Examples 1 to 3 was applied onto a glass substrate to have a width of 10 mm, a length of 50 mm, and a thickness of 40 µm, and the substrate was put in a constant-temperature bath of 80° C. for 60 minutes or 120 minutes, and thus, a test piece (in which a conductive layer that is a cured product formed by applying a conductive silicone composition onto a glass substrate, and by curing the conductive silicone composition at 80° C. was formed on the glass substrate) was obtained.

Measurement of Resistance Value

In each of the test pieces described above, a resistance value of the conductive layer was measured by using a digital multimeter, in accordance with a two-terminal method. Results are shown in Table 2.

TABLE 2

| Test | Example 1 | Example 2 | Example 3 | Comparative Example 1 | Comparative Example 2 | Comparative Example 3 |
|---|---|---|---|---|---|---|
| Conduction properties (1) [$10^{-5}$ Ω · m] (Curing condition: 80° C. × 60 minutes) | 0.8 | 0.7 | 1.0 | 37.0 | 2.5 | 1.1 |
| Conduction properties (2) [$10^{-5}$ Ω · m] (Curing condition: 80° C. × 120 minutes) | 0.8 | 0.7 | 1.0 | 14.0 | 1.3 | 1.0 |

From Examples 1 to 3 of Table 2, it is found that the present invention is a conductive silicone composition that is cured at a low temperature in a short time and from which a cured product having excellent conductivity is obtained.

On the other hand, Comparative Example 1 of Table 2 is a conductive silicone composition not containing the (D) component of the present invention, and it is found that a high resistance value is exhibited, and conduction properties are degraded compared to Examples. In addition, Comparative Examples 2 and 3 are out of the blending range of the (D) component, which is the characteristics of the present invention, and it is found that in the test of the conduction properties 1, the conduction properties are degraded compared to Examples.

In addition, in a case where Examples 1 and 3 of Table 2 (the addition amount of the (E) component is 66 mass % with respect to the entire conductive silicone composition) is compared to Comparative Example 3 (the addition amount of the (E) component is 68 mass % with respect to the entire conductive silicone composition), it is found that in Examples 1 and 3, more excellent conduction properties are attained in the test of the conduction properties 1. As described above, an effect that Examples 1 and 3 in which the content rate of the conductive powder is low have more excellent conduction properties than those of Comparative Example 3 in which the content rate of the conductive powder is high is not capable of being expected by a person skilled in the art.

Further, in the conductive silicone composition of Examples 1 to 3 and Comparative Examples 1 to 3, (3) Conduction Properties after 100%-Stretching Cycle Test and (4) Adhesion described below were evaluated.

<(3) Evaluation of Conduction Properties after 100%-Stretching Cycle Test>

The conductive silicone composition obtained in Examples 1 to 3 and Comparative Examples 1 to 3 was applied onto a glass plate covered with a polytetrafluoroethylene sheet to have a width of 10 mm, a length of 50 mm, and a thickness of 200 μm, and the plate was put in a constant-temperature bath of 80° C. for 120 minutes, and thus, a test piece was prepared.

Next, the test piece was fixed to chucks, and by using an endurance tester (DLDM111LHB, manufactured by YUASA SYSTEM CO., LTD.), 100% (twice the initial length) stretching was performed 500 cycles at a period of 50 cycles per 1 minute. After 500 cycles, a case where the resistance was capable of being measured with a digital ohmmeter was evaluated as acceptable, and a case where the resistance is not capable of being measured (an insulated state) was evaluated as unacceptable.

<(4) Evaluation of Adhesion (Creep Test)>

Measurement was performed on the basis of JIS K6883-1 (2008). That is, the conductive silicone composition of Examples 1 to 3 and Comparative Examples 1 to 3 was applied onto a gold-plated adherend to have an area of 5 mm x 50 mm and a thickness of 200 μm, and the adherend was put in a constant-temperature bath of 80° C. for 1 hour, and was cured, and thus, a cured product was obtained.

After that, a creep test was implemented by suspending a weight of 10 g from the cured product with a clip in an environment of 23° C. and 50% RH, and evaluation was performed by a falling time. Results are shown in Table 3. As the criterion of the falling time, in a case where it is visually observed that an adhesive agent (the cured product) is peeled off from the gold-plated adherend by greater than or equal to 10 mm in a length direction, it is considered that the weight falls. Note that, measurement was implemented every 30 minutes until 24 hours. In the present invention, it is indicated that adhesion is excellent as the falling time becomes longer.

From Examples 1 to 3 of Table 3, it is found that Examples 1 to 3 of the present invention are capable of maintaining the conduction properties even after the 100%-stretching cycle test, and are also excellent in the adhesion with respect to gold plating. On the other hand, Comparative Example 1 is a conductive silicone composition not containing the (D) component of the present invention, and it is found that the adhesion is degraded compared to Examples. In addition, Comparative Examples 2 and 3 were out of the blending range of the (D) component, which is the characteristics of the present invention, and had a degraded result in the evaluation of the adhesion.

INDUSTRIAL APPLICABILITY

The present invention is industrially useful since the present invention can be used in various conductive silicone composition applications and is effective, from the viewpoint of being cured at a low temperature in a short time and of obtaining the cured product having excellent conductivity.

This application is based on Japanese Patent Application No. 2018-093517 filed on May 15, 2018, the disclosure content of which is incorporated by reference in its entirety.

The invention claimed is:

1. A conductive silicone composition containing (A) to (E) components described below and containing greater than or equal to 10 parts by mass and less than 100 parts by mass of the (D) component with respect to 100 parts by mass of the (A) component:

(A) component: a polyorganosiloxane having one or more alkenyl groups in a molecule (B) component: a compound having a hydrosilyl group (C) component: a hydrosilylation catalyst (D) component: a silane compound having an epoxy group and an alkoxysilyl group (E) component: a conductive powder,

TABLE 3

| Test | | Example 1 | Example 2 | Example 3 | Comparative Example 1 | Comparative Example 2 | Comparative Example 3 |
| --- | --- | --- | --- | --- | --- | --- | --- |
| Evaluation of conduction properties after 100%-stretching cycle test | Presence or absence of conduction | Acceptable | Acceptable | Acceptable | Acceptable | Acceptable | Acceptable |
| Evaluation of adhesion (creep test) | Falling time | Longer than or equal to 24 hours | Longer than or equal to 24 hours | Longer than or equal to 24 hours | 30 Minutes | 1 Hour | 5 Hours | wherein the (B) component is a compound having a constituting unit represented by Formula (1):

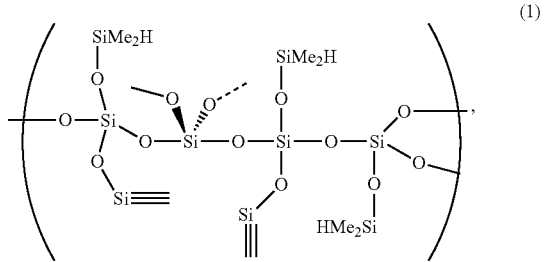

(1)

and the (E) component is a metal particle consisting of one or more metals selected from the group consisting of gold, silver, copper, nickel, palladium, platinum, tin, and bismuth, or an alloy particle consisting of a combination of a plurality of these metals.

2. The conductive silicone composition according to claim 1,
wherein the alkoxysilyl group of the (D) component is an ethoxysilyl group.

3. The conductive silicone composition according to claim 1,
wherein the (E) component is contained in a range of 5 mass % to 95 mass % with respect to the entire conductive silicone composition.

4. The conductive silicone composition according to claim 1,
wherein the (E) component has a spherical shape.

5. The conductive silicone composition according to claim 1,
wherein the conductive silicone composition is a liquid at 25° C.

6. The conductive silicone composition according to claim 1, further containing:
a reaction rate regulator as an (F) component.

7. The conductive silicone composition according to claim 6,
wherein the (F) component is selected from maleic acid esters.

8. A cured product obtained by curing the conductive silicone composition set forth in claim 1.

9. The conductive silicone composition according to claim 1,
wherein the (D) component comprises 3-glycidoxypropyl methyl diethoxysilane or 3-glycidoxypropyl triethoxysilane.

10. The conductive silicone composition according to claim 1,
wherein a specific surface area of the (E) component is 1 m²/g to 10 m²/g.

* * * * *